United States Patent
Suchenwirth-Bauersachs et al.

(10) Patent No.: US 6,587,572 B1
(45) Date of Patent: Jul. 1, 2003

(54) MAIL DISTRIBUTION INFORMATION RECOGNITION METHOD AND DEVICE

(75) Inventors: Richard Suchenwirth-Bauersachs, Radolfzell (DE); Walter Rosenbaum, Paris (FR); Udo Miletzki, Constance (DE)

(73) Assignee: Siemens Aktiengesellschaft, München (DE)

(*) Notice: Subject to any disclaimer, the term of this patent is extended or adjusted under 35 U.S.C. 154(b) by 0 days.

(21) Appl. No.: 09/423,211
(22) PCT Filed: Mar. 27, 1998
(86) PCT No.: PCT/DE98/00897
§ 371 (c)(1), (2), (4) Date: Nov. 3, 1999
(87) PCT Pub. No.: WO98/50173
PCT Pub. Date: Nov. 12, 1998

(30) Foreign Application Priority Data

May 3, 1997 (DE) .......................... 197 18 805

(51) Int. Cl.⁷ .............................. G06K 9/00; B07C 7/00
(52) U.S. Cl. ...................... 382/101; 235/375; 209/584; 209/630
(58) Field of Search ............... 382/100, 101, 382/103, 108, 218; 209/44.4, 546, 584, 587; 235/375; 704/251, 270; D6/422

(56) References Cited

U.S. PATENT DOCUMENTS

| 4,921,107 A | 5/1990 | Hofer .................... 209/546 |
| 4,992,649 A * | 2/1991 | Mampe et al. ............... 209/546 |
| 5,311,999 A * | 5/1994 | Malow et al. ............... 209/583 |
| 5,538,138 A * | 7/1996 | Reich ....................... 209/3.3 |
| 5,558,232 A | 9/1996 | Stevens et al. ............ 209/584 |
| 5,770,841 A * | 6/1998 | Moed et al. ................. 40/518 |
| 6,169,936 B1 * | 1/2001 | Lohmann .................... 700/223 |

FOREIGN PATENT DOCUMENTS

| DE | 195 31 392 | 1/1997 |
| EP | 0 726 540 | 8/1996 |
| FR | 2 591 512 | 6/1987 |

OTHER PUBLICATIONS

IBM Technical Disclosure Bulletin, "Postal Scale with Speech Recognition", vol. 37, No. 10, Oct. 1994, pp. 667–668.
IBM Technical Disclosure Bulletin, "Kanji Recognition and Reconstruction in Postal Address", vol. 37, No. 7, Jul. 1994, pp. 563–564.

* cited by examiner

Primary Examiner—Jayanti K. Patel
(74) Attorney, Agent, or Firm—Venable LLP; Robert Kinberg; Catherine M. Voorhees

(57) ABSTRACT

The invention pertains to mail distribution information recognition technology, involving video-coding stations. According to the invention, the distribution information is fed into the screen of a video-coding unit by means of a speech input unit comprising a microphone (60), a speech recognition module (70) and, if need be, a key board (50). The input data are compiled to a list covering all possible proposals concerning the recognition of the distribution information, said proposals being assessed according to the plausibility criterion. After removal of the little plausible proposals, the selected ones are displayed.

9 Claims, 2 Drawing Sheets

MAIL DISTRIBUTION INFORMATION RECOGNITION METHOD AND DEVICE

BACKGROUND OF THE INVENTION

The invention relates to a method and an arrangement for recognizing distribution information on mail items and can be used particularly advantageously for determining distribution information written in non-alphabetic language on mail items.

Systems for the automatic reading of distribution information, particularly addresses (OCR), are well known in the field of mail processing and are described, for example, in the DE 195 31 392. Modern OCR letter sorting equipment makes it possible to achieve processing rates of 10 letters per second, that is to say 36,000 letters per hour and more. However, the recognition reliability varies strongly based on the lettering style and total quality of the address information on the surfaces of the letters. In the case of a successful recognition, the respective letter can be provided with a machine-readable bar code. This bar code permits a further mechanical processing up to an optionally desired sorting arrangement. In particular, the use of bar codes makes it possible to sort the letters up to the sorting level of the mail carrier route, for which letters are sorted on the basis of the distribution sequence by the delivery person.

Economic trends and an increased mail volume in Asia have led to increased efforts in the automatic recognition of eastern writing styles, so as to limit costs and improve the delivery of mail. As compared to the situation in western countries where mail automation already represents an established technology, the recognition systems must meet new requirements, which stem from the fact that Chinese characters are used for local mail addresses in most countries of the Asiatic basin. Unlike the letters used in western alphabetic writing, Chinese characters are configured as ideograms. Each of these ideograms can represent a word. In place of an alphabet numbering thirty to sixty letters, 3000 to 6000 different Chinese characters are used daily, each with its own characteristic form. This practical non-perfectivity of the Chinese character system and the ideographic structure of the individual characters lead to a reduced effectiveness of OCR systems as compared to western alphabetical writing systems. In addition, problems are caused by the fact that the address on postal items appears to be oriented either in vertical or in horizontal direction and that frequently there is a mixture of Chinese and western writing.

Since the recognition rates for the automatic reading systems generally vary considerably for western as well as for Chinese characters, it is necessary to support these through various forms of manual intervention. Reverting to a manual sorting method is the simplest method of intervention in case of a rejection of letters that cannot be read automatically. However, the resulting costs are uneconomically high, owing to the increasing operating costs. Added to this is the fact that such hand-sorted mail cannot be further sorted mechanically at a later point in time, so that two separate flows of mail items are created, which must again be combined manually at a specific point in time.

Various methods for manually coding mail items have been developed to avoid the disadvantages of the manual sorting of OCR rejected mail items. All of these methods use operator intervention to apply bar codes to the mail items, in a manner that is consistent with the requirement for a mechanical sorting with the same equipment used to process the OCR read and bar-coded mail.

Another method for coding rejected mail items uses so-called manual coding stations. At these manual-coding stations, the mail items are physically moved sequentially past an operator, wherein the operator encodes as much information for each of these items, as is necessary to clearly identify the destination location. In the process, the input address is converted by means of a directory to a sorting bar code, which is then applied to the mail item. The coded mail items are then processed further with the aid of bar-code sorters (BCS), which are mechanically identical to OCR-suitable BCS. Such manual coding stations were initially introduced by the US Postal Service and the Royal Mail in the Seventies. The main disadvantages of such devices are the required removal of mail items from the OCR mail flow and the ergonomic difficulties, experienced by the operator during the recognition of the mail items that are moved past the operator.

The next advance in the treatment of mail items rejected in the OCR was the development of on-line video-coding systems (OVS). In an OVS, a video image of the item is presented to an operator for coding in place of the physical mail item that is present at manual coding stations. The video image is shown to the operator while the physical item is held in delay loops. In these delay loops, the item is normally held in motion for a period of time that is sufficient for the OVS operator to input the necessary sorting information for the respective image. The standard delay loops permit a delay of between 10 and 30 seconds. The longer the delay loop, the higher the costs as well as the requirements for maintenance and the physical size of the installation.

The main problem when using OVS is that the available time is sufficient only for a careful input of the zip code (ZIP) or the postal code (PC) unless long, impractical delay loops are used.

As long as a ZIP or PC exists, OVS can also be used effectively for items addressed with Chinese characters. However, the share of such mail items in many eastern countries is very low and probably will remain so in the foreseeable future.

For that reason, special coding methods were developed to keep the on-line delay time as low as possible.

In order to increase the coding productivity and/or make it possible to give all address elements, meaning the ZIP/PC, street/post office box, addressee/post office box, addressee/firm, various methods have been developed in prior art. Essentially, these include:

Preview Coding:

The preview coding involves a simultaneous display of images from two mail items, one above the other. The lower image in this case is the active one, meaning the one for which data are coded. Following a suitable training, operators can encode the information on the lower image while simultaneously visually recognizing the address information on the upper image. The upper image subsequently becomes active and the process is continued. The preview coding makes it possible to double the operator productivity through a complete overlapping of the cognitive and the motorized functions during the coding of sequential images.

Extraction Coding:

Owing to the fact that only the ZIP/PC address elements can be input reliably by the operator given the on-line delay times that can be achieved in practical operations, certain key components of the address components referring to the street are input during the extraction coding. The extraction coding normally is based on specially developed rules, for which a code with fixed length is used as access key to an address directory. For example, the Royal Mail uses an extraction formula that is based on the first three and the last two letters. For this, the operator must memorize special rules to avoid superfluous address information and to take into account specific, distinguishing characteristics, e.g. directions such as east, west or categories such as street, lane, road.

Despite being very effective, extraction coding has several considerable disadvantages, particularly complex extraction rules, which frequently require taking into account the end of a street name, even though these components normally are the least clear with hand-written addresses on mail items. In addition, there is a significantly high rate of unclear extractions, for which several entries in a directory correspond to the extraction code, so that it is not possible to make a definite sorting decision. It must also be considered that the input productivity of the operators is reduced as soon as the operators must make decisions instead of a simple repetitive keyboard entry.

Completion Coding

In contrast to the extraction coding, a variable input for each address to be coded must be made during the completion coding. Essentially, a comparison with the address directory takes place during the address input until a clear match has been found. An acceleration effect is achieved by displaying the remainder of the address as soon as a clear partial match has been identified. However, problems occur with this technique in that the operator must be supplied with an input-stop signal and that a display of the identified address remainder is required, which leads to reduced input productivity and makes a preview coding impossible.

Theoretically, all described video-coding techniques can also be used for mail items with Chinese characters, even though the lack of fast input techniques for Chinese characters continues to makes them only marginally usable.

Operator-assisted OCR Technique:

In order to increase the address information to be processed on-line, the US Postal Service has experimented with operator-assisted OCR techniques. For this, that portion of the address image for which the OCR recognition has failed is emphasized in order to increase the effectiveness. Since the operators are slow when deciphering missing letters and, in part, complex recognition errors such as segmenting problems occur as well, the operator productivity with this method is frequently lower than if the respective address is simply input once more.

Off-line Coding:

Since none of the aforementioned coding techniques make it possible to achieve a sufficiently high productivity for the pure on-line coding, an off-line coding system was recently introduced, e.g. as described in the US PS 49 92 649. In this system, mail items with unrecognized addresses are provided with an additional information, a tracking information (TID). The unrecognized mail items are stored externally, while the images of these mail items are presented to operators for coding, wherein time limitations in the range of seconds do not exist. The mail items are subsequently presented to TID reading devices. The TID is linked to the input address information. Based on this, a standard bar code sorting information can also be applied to the mail item, so that the respective mail item can be processed in the same way as mail items normally read with OCR. Even though the off-line video-coding method represents an effective method for coding all address components, additional capacities for the further processing of mail items with unread addresses and a correspondingly complex logic are required.

Basically, the operator-assisted OCR techniques are also suitable for processing mail items with Chinese characters, but they do not as yet permit a fast input of such characters.

This unsatisfactory situation is only made worse in that the operator faces relatively high requirements with respect to the necessary training and required knowledge.

SUMMARY OF THE INVENTION

The method and arrangement according to the invention are intended to solve the problem of quickly coding distribution information in the form of addresses, particularly non-alphabetic handwriting on mail items while making fewer demands on the personnel as compared to known solutions.

This is achieved by an arrangement for recognizing distribution information on mail items; which includes a device for obtaining images of mail items, an OCR unit for automatic evaluation of images of mail item surfaces that contains the distribution information, a video-coding device for recording the images of the mail item surfaces with at least one video-coding station; a processing unit that controls data flows between the input units and the output units of the video-coding device and the OCR, and a voice input unit with a microphone and a voice recognition module connected to each video-coding station where distribution information suggestions with the highest reliability are transmitted by means of the processing unit to a screen of a respective video-coding station for selection or confirmation, following a comparison with a dictionary.

The coding input by means of a speech input unit permits a very quick input of the address information, even for relatively untrained personnel and has particular advantages for the coding of hand-written addresses in Chinese characters without postal code (ZIP).

Advantageous embodiments of the invention follow from the dependent claims.

If keys of a keyboard are used in addition to the voice input for the coding input, especially for numerical distribution information components or frequently occurring higher target areas by means of control keys, an even more secure input is possible. The components of the distribution information, input with the aid of different input media, are then combined to form complete distribution data.

It is furthermore advantageous if a simultaneous address evaluation takes place in an OCR unit to increase the recognition safety and if the distribution information suggestions are combined with the suggestions obtained through the input procedure to form a complete list of distribution information suggestions with new reliabilities.

It is also advantageous if the distribution information suggestions of the OCR unit are correlated with the keyboard entry data to correct errors.

In another advantageous embodiment of the invention, implausible distribution information suggestions are removed from the complete list by means of statistically determined threshold values for reliability values so that a final selection of the distribution information suggestions can be made quicker and easier.

It is also advantageous if frequently addressed, larger target areas are assigned to a control key.

According to claim 6, it is also advantageous if frequently addressed, larger target areas are assigned to a control key.

BRIEF DESCRIPTION OF THE DRAWINGS

The invention is explained in further detail in the following with the aid of drawings, wherein the following is shown.

DETAILED DESCRIPTION OF THE INVENTION

Figure 1:
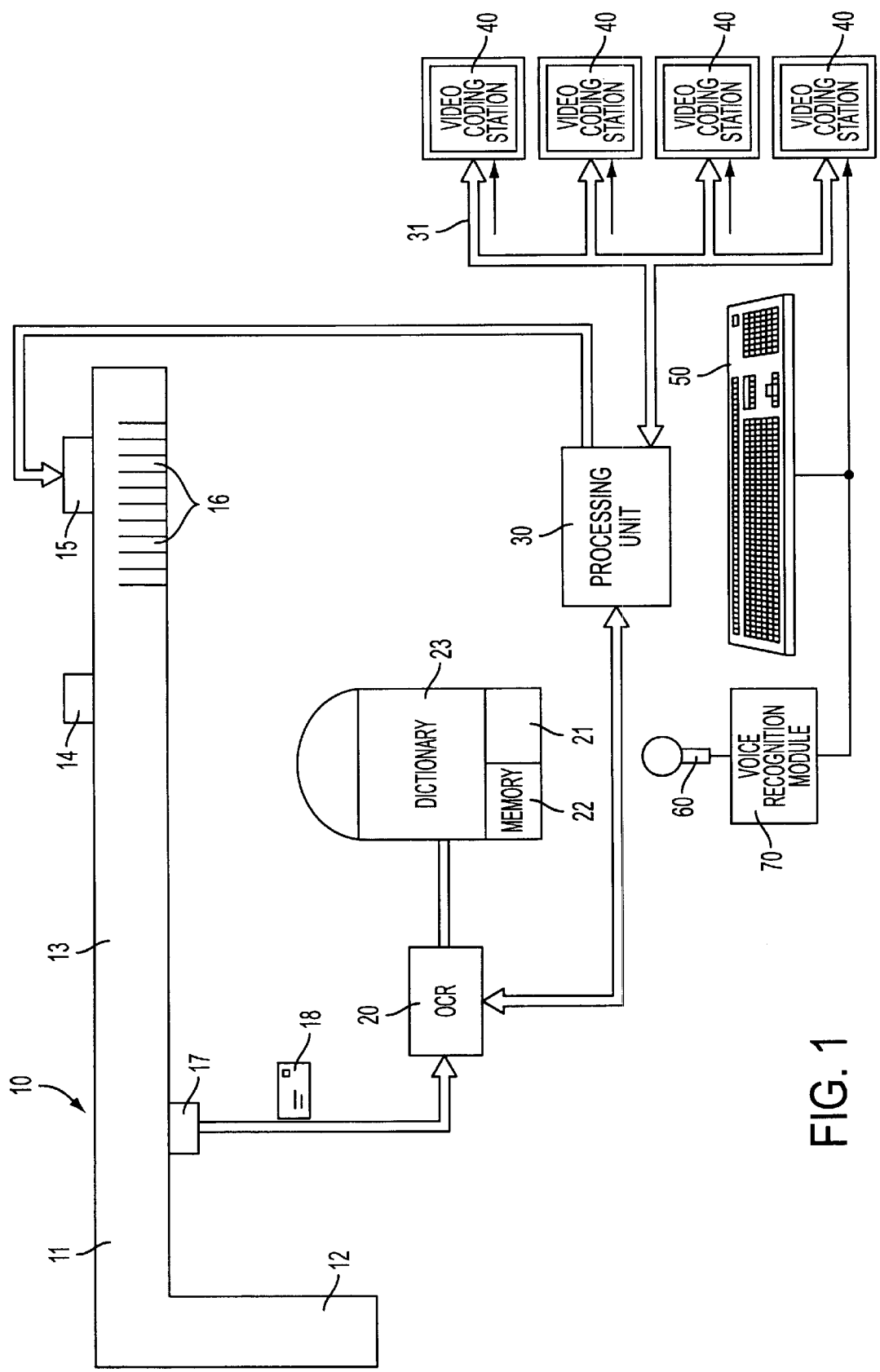
FIG. 1 A schematic representation of an arrangement according to the invention.

FIG. 1 shows a schematic representation of a letter distribution facility for realizing the method according to the invention. An OCR letter sorter 10 comprises a feeding device 11, which pulls successive mail items from a magazine 12 and transports these at the rate of approximately 10 items per second to a high-resolution video scanner 17, which serves as a device for obtaining images 18 of the mail items. The mail items are subsequently transported in a delay loop 13. The mail items normally contain distribution information, particularly address information on their surfaces. The address information on the mail item images, obtained with the aid of video scanner 17, is evaluated in an OCR unit 20. In case of a complete evaluation, a bar code printer 14 is actuated and the mail item is provided with a respective bar code for the subsequent sorting into sorting compartments 16. The OCR unit 20 consists of one or more microprocessors 21 with associated memory 22 for storing the images of the mail items. The OCR unit furthermore includes a dictionary 23 with ZIP codes, city names and street names and possibly additional address-related information. When evaluating the images containing the address information, a feature-controlled reduction of the entry obtained from the address listing preferably occurs, so that a type of partial dictionary is created. In that case, reliabilities are assigned to the individual entries, so that a number of data of addresses recognized as correct are created during the evaluation. The arrangement furthermore comprises a processing unit 30, as well as a number of video-coding stations 40, which are connected directly or via a local network (LAN) 31 to the processing unit. It is preferable if workstations are used as video-coding stations. If the OCR evaluation of an image was not completely successful, this image is transferred from the OCR unit 20 to the processing unit 30, which controls among other things a TID bar code printer 15 and sends the corresponding image to one of the video-coding stations 40. The TID bar code printer 15 affixes an identification code TID to the corresponding mail item, which makes it possible at a later point in time to link the evaluated address information with the physical mail item. The evaluation of the images in this case preferably occurs off-line, even though an on-line evaluation through video-coding is in principle also possible with a sufficiently long delay time. In the latter case, the TID can also be applied at a later point in time to the mail item, that is to say if the video-coding has not resulted in a complete evaluation during a specific, predetermined time interval.

As indicated schematically, a keyboard 50 for a keyboard input and a voice input unit, consisting of a microphone 60 and a voice recognition module 70, are connected to each video-coding station 40.

Figure 2:
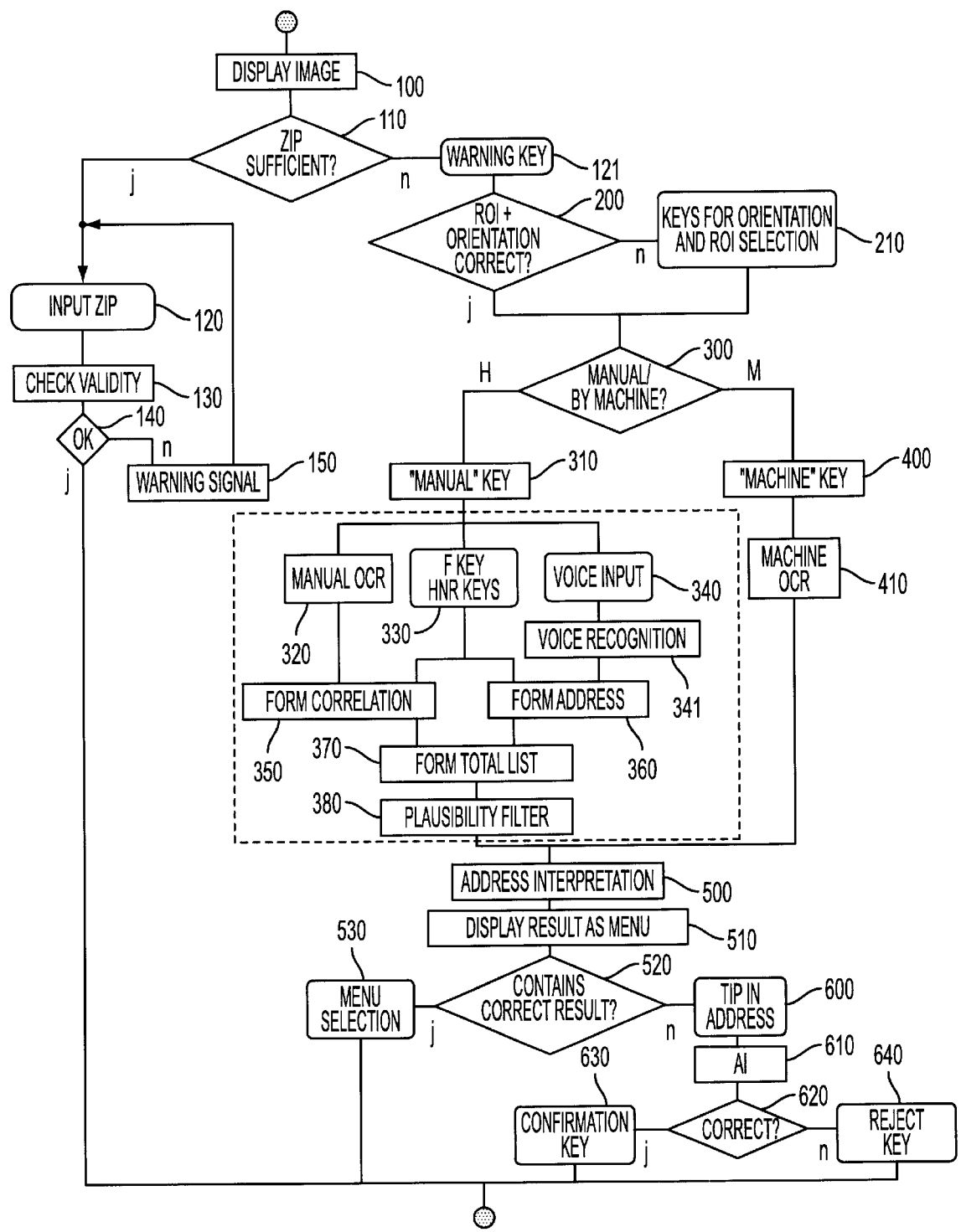
FIG. 2 A flow chart describing the coding of mail items according to the invention.

According to FIG. 2, the image (in 2 or more gray levels) of a mail item (e.g. a letter, mailing pouch, package) with additional information relating to the results of the previous processing (e.g. orientation, position of address block) is present for the input. A character string containing distribution information assigned to the mail item image is made available at the output.

The mail item image is displayed 100 on the screen of the video-coding station, wherein the possible address fields (ROIs) have a colored border and are marked with consecutive numbers starting with 1. The preferred ROI is emphasized relative to the other ROIs with a different color (e.g. red). The operator decides whether the mail item image contains a visible postal code (ZIP) 110 that is sufficient for the intended distribution. If so, the operator inputs this code via the keyboard 120. At the completion of the input, the validity of the ZIP is checked with the aid of a list of reliable ZIP codes 130, 140. If the ZIP is not valid, a warning signal 150 is sounded (e.g. an acoustic signal) and a renewed input 120 is expected. If the ZIP is valid, it will be output as result, and the processing of this mail item is completed.

If the mail item image does not contain a sufficient ZIP, the operator depresses a warning key 121 (e.g. ESC) and checks whether the orientation and the selected address region (ROI) of the mail item image have been determined correctly 200. If this is not the case, the operator selects the correct orientation with control keys and/or the correct ROI via number keys 210.

The character recognition (OCR) is initiated by a decision on whether the preferred ROI contains handwriting or machine writing. This decision is prepared in a statistically adapted classifier 300 and is confirmed by the operator (with the space bar) or is corrected (for example with the keys "H" or "M") 310/400.

If a hand-written address is present, the multimedia recognition by means of voice input and manual input is actuated. For this, the preferred ROI are simultaneously processed with the manual OCR 320. The operator inputs the name of the city (if defined) via a control key and the numerical components of the address (e.g. house numbers) via number keys 330. At the same time, the operator speaks the name of the city (if not defined on the control key) or in another case the name of the street into the connected microphone 340. The analog voice signal from the microphone is changed to digital data and is processed by the voice recognition module 341, wherein a list of candidates is set up that is evaluated on the basis of reliability measures.

The result of the manual OCR 320 is correlated 350 with the input key codes 330 in such a way that if there is a city name, it is compared to the city name from the manual OCR and said name is corrected in case of a conflict, that the digit sequence representing the numerical address components is compared with respect to position and value to the OCR result and this result is corrected in case of a conflict. The result of the correlation is a list of reliability values, comprising one or several character chains that represent in each case a well-written address.

The result of the voice recognition 341 is composed 360 with the aid of the input key codes 330 in such a way that the address components (city name, street name, house number, etc) in a character chain are lined up in the correct sequence. A corresponding character chain is created from each candidate in the voice recognition 341.

The character chains, produced in the steps 350 and 360, are combined 370 with cumulative reliability measures for the same character chains to form a complete list with a uniform format. With the aid of statistically adapted threshold values for reliability measures, sufficiently implausible results are removed from the complete list 380. A list of alternative addresses is then available as a result.

If a machine-written address exists, the preferred ROI is processed 410 in the traditional manner by an OCR with parameters adapted to machine writing.

The result of steps 380 or 410 are processed with a traditional address interpretation 500, which checks for each address alternative to determine whether it is syntactically well-formed and exists in the dictionary, determines the respective ZIP from the dictionary and provides one or several result alternatives, respectively consisting of the ZIP and the complete or sufficiently unambiguous address character sequence as the result.

The result of the address interpretation is displayed on the screen 510 in the form of a selection menu (multiple choice), wherein the result alternative with the highest reliability appears as the first position. The operator then checks whether the result 520, which corresponds to the mail item, is contained in the menu by comparing the mail item image 100 and the menu 500. If this is the case, the operator marks the appropriate result 530 with a figure key (or the space bar, corresponding to the first alternative). The ZIP assigned to the selected alternative is output as result, and the processing of the mail item is completed.

If the correct result is not contained in the menu, the operator writes down the address via letter keys with shortened, phonetic or another coding 600. The input character sequence is processed with another polling of the traditional address interpretation and the result is again displayed in the form of a menu 610. As for step 530, the operator selects the correct result from 630 or, if the correct result is not contained in the menu, the operator actuates the REJECT key 640, which leads to a final rejection of the current item. This item must then be processed further in a manual distribution or the like.

What is claimed is:

1. A method for recognizing distribution information on surfaces of mail items with the aid of video-coding stations to which acquired, digitized and stored images of the mail item surfaces containing the distribution information are supplied, wherein the determined distribution information is compared to dictionaries, comprising the steps of:

displaying the respective distribution information of a mail item surface on a screen of the video-coding station and inputting totally or in part the respective distribution information by means of a connected voice input unit, including a microphone and a voice recognition module, where distribution information suggestions for a mail item surface are generated in the voice input unit and evaluated as to reliability, so that the suggestion or suggestions with the highest reliability for confirmation/selection is (are) displayed on the video-coding station screen following a comparison with the dictionary.

2. A method according to claim 1, wherein at least existing numerical parts of the respective distribution information displayed on the video-coding station screen are input with the aid of a keyboard and names are input with the aid of the voice input unit;

for each distribution information, the data input with the keyboard and the name candidates determined via the voice input and evaluated on the basis of reliability are combined to form a list of complete distribution information suggestions; and following a dictionary comparison, the suggestion or suggestions for information distribution with the highest reliabilities for the valid distribution information is (are) transmitted to the screen of the video-coding station for confirmation/selection.

3. A method according to claim 2, wherein in addition to the input of numerical components of the distribution information by way of figure keys, larger mail item destinations can be input via control keys.

4. A method according to claim 1, wherein the respective distribution information is additionally evaluated in an OCR unit, which results in a list of distribution information suggestions based on reliability, and this list is combined with the list of distribution information suggestions based on reliability, determined at least via the voice input, to form a complete list with a uniform format, comprising reliabilities that result from the two lists, from which the candidates with the highest reliabilities are displayed on the screen of the video-coding station following a dictionary comparison.

5. A method according to claim 4, wherein the distribution information suggestions from the OCR unit are correlated with the data input via the keyboard, a correction is made in case of a conflict and the resulting list of distribution information suggestions, rated as to reliability, is used to form the complete list.

6. A method according to claim 1, wherein distribution information suggestions that are not plausible for reliability, as determined by the evaluating step, are removed via a plausibility filter from the complete list by means of statistically determined threshold values.

7. An arrangement for recognizing distribution information on mail items, wherein the distribution information is compared to dictionaries, comprising:

a device for obtaining images of mail items;

an OCR unit for the automatic evaluation of the images of mail item surfaces containing distribution information;

a device for video-coding the images of the mail item surfaces containing the distribution information, said video-coding device having at least one video-coding station;

a processing unit, which controls data flows between input units and output units of the device for video-coding and the OCR unit; and a voice input unit including a microphone and a voice recognition module, said voice input unit being connected to each video-coding station and distribution information suggestions being supplied by the voice input unit, where the distribution information suggestions with the highest reliability are transmitted by means of the processing unit to a screen of the respective video-coding station for selection or confirmation, following a comparison with the dictionary.

8. An arrangement according to claim 7, wherein complete distribution information suggestions are generated in the processing unit from the name suggestions and key input signals, generated with the voice input unit.

9. An arrangement according to claim 7, wherein from the list of distribution information suggestions rated according to reliability and determined at least via the voice input unit, and a list of distribution information suggestions rated according to reliability generated in the OCR unit, a complete list of distribution information suggestions is generated in the processing unit with reliabilities based on both lists, for which the most believable suggestions are transmitted to a video-coding station to be displayed there.

* * * * *